(12) United States Patent
Lannes et al.

(10) Patent No.: US 6,752,347 B2
(45) Date of Patent: Jun. 22, 2004

(54) METHOD FOR IMPROVING THE OPERATING RELIABILITY OF A REEL-UP

(75) Inventors: Petteri Lannes, Jokela (FI); Sami Palokangas, Nurmijärvi (FI); Jussi Alanen, Vantaa (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/257,508

(22) PCT Filed: Apr. 10, 2001

(86) PCT No.: PCT/FI01/00352

§ 371 (c)(1),
(2), (4) Date: Feb. 12, 2003

(87) PCT Pub. No.: WO01/77766

PCT Pub. Date: Oct. 18, 2001

(65) Prior Publication Data

US 2003/0141404 A1 Jul. 31, 2003

(51) Int. Cl.$^7$ ............... B65H 18/16; B65H 18/26; B65H 26/00
(52) U.S. Cl. ............ 242/534; 242/541.7; 700/126
(58) Field of Search ............... 242/534, 534.2, 242/547, 541.4, 541.5, 541.6, 541.7, 413.1; 700/126

(56) References Cited

U.S. PATENT DOCUMENTS

| | | | | |
|---|---|---|---|---|
| 5,971,315 A | * | 10/1999 | Kojo | 242/534.2 |
| 6,047,275 A | | 4/2000 | Jaremko et al. | |
| 6,363,297 B1 | * | 3/2002 | Wienholt et al. | 242/534 |
| 6,584,366 B1 | * | 6/2003 | Liepold et al. | 700/126 |

FOREIGN PATENT DOCUMENTS

| | | |
|---|---|---|
| DE | 44 25 355 A1 | 1/1995 |
| DE | 195 31 692 A1 | 4/1996 |
| DE | 195 05 506 A1 | 8/1996 |
| DE | 198 32 967 C1 * | 4/2000 |
| EP | 0 460 892 A2 | 12/1991 |
| EP | 0 710 901 A1 | 5/1996 |
| WO | WO 97/22543 A1 | 6/1997 |
| WO | WO 99/50719 A1 | 10/1999 |
| WO | WO 01/77766 A1 | 10/2001 |

OTHER PUBLICATIONS

International Search Report issued in International Application No. PCT/FI01/00352.
International Preliminary Examination Report issued in International Application No. PCT/FI01/00352.
Papermaking Science and Technology, Book 10, Papermaking Part 3, Finishing, Johan Gullichsen and Hannu Paulapuro.

* cited by examiner

Primary Examiner—John M. Jillions
(74) Attorney, Agent, or Firm—Stiennon & Stiennon

(57) ABSTRACT

In reeling up of a paper web, a continuous paper web is reeled around a reeling core/reeling cores into successive machine reels or customer rolls. The actual control system controlling the reeling up process is supplemented with a substantially separate, model-based learning fault diagnostics. The fault diagnostics in a diagnostic state detects the malfunctions in components critical in view of the operation of the reel-up by monitoring measuring, control and actuating variables of the reel-up and by comparing them with a model formed during a learning state. In a fault tolerance state the fault diagnostics actively affects the measuring, control and actuating variables to maintain the function of the reel-up, and improve operating reliability.

18 Claims, 2 Drawing Sheets

METHOD FOR IMPROVING THE OPERATING RELIABILITY OF A REEL-UP

CROSS REFERENCES TO RELATED APPLICATIONS

This application is a US national stage application of PCT Application No. PCT/FI01/00352, filed Apr. 10, 2001, and claims priority on Finnish Application No. 20000869 filed Apr. 12, 2000, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method for improving the operating reliability in reeling up of a paper web.

A continuous paper web coming from a paper machine or from a finishing apparatus connected thereto in a continuous, i.e. on-line type manner, is reeled in the reel-up into successive machine reels. The machine reels can be seen as a kind of an intermediate storage for the paper web, in which the paper web is stored in the end of a continuous manufacturing process that precedes reeling up. Reeling up is also used in connection with off-line type finishing processes (e.g. calendering, coating) to reel a full-width paper web into machine reels again after the unwinding conducted in the beginning of said process and the treatment/treatments following thereafter. If the web is slit into part webs in connection with these finishing processes, the results of the reeling up are narrower so-called customer rolls that correspond to the width of the part webs.

Because the reeling up is an essential part of the treatment of the paper web/webs at one or several stages of the production and finishing processes of paper, the operation and operating reliability of the reel-up is thus a significant factor in view of the overall function of said processes. The entire reeling up process should be implemented in such a manner that it does not cause disturbances (e.g. stoppages) in the function of the other parts of the process. In addition, the properties and quality (hereinbelow referred to as reeling quality) of the paper web to be reeled up should not be weakened during the reeling up itself or as a result of the same at later stages of the process.

The aim to better control the reeling up process and to attain a better operating reliability and a uniform reeling quality has led up to the development of the mechanical functions of the reeling apparatuses themselves as well as the control methods controlling these functions.

The structure and function of the reel-ups currently in use are described for example in the book by Mikko Jokio: Papermaking Part 3 Finishing, published by Fapet Oy, ISBN 952-5216-10-1, 1999, pp. 143–235.

In the most advanced, so-called second generation reel-ups (see e.g. Papermaking Part 3 Finishing, pp. 160–165), the most important parameters to be adjusted during the actual reeling up sequence, i.e. reel formation, are the web tension of the paper web passed to the reeling, the pressing force, i.e. so-called nip force between a so-called reeling cylinder that guides the web on the roll and the paper reel that is being formed, as well as the torque of the centre-drive of the reeling core of the paper roll. To attain the desired reeling quality for the paper web and desired treatment properties for the reel that is being produced, these parameters are not necessarily kept constant during the reeling up process, but they are adjusted in connection with the same paper grade as a function of the amount of paper accumulated on the reeling core, and for paper grades that differ from each other it is possible to use different parameter values that change in different ways as a function of the amount of paper accumulated on the reeling core.

During the reeling up sequence the increase in the number of adjustable parameters as well as the aim to better optimize said parameters during reeling also increases the requirements for the control methods used for controlling the reeling up. For example, the international publication WO 99/50719 discloses a control method that utilizes neural network computation to produce optimal control variables for a reeling apparatus of paper during the reeling up sequence according to the desired reeling quality at a given time.

In addition to the adjustments made during the actual reeling up sequence, the reeling up apparatus conducts a change sequence after the reel/reels have been finished, in which the finished roll/rolls is/are transferred away from the reel-up and at the same time a new reeling core/new reeling cores are brought therein and the web/webs are threaded on said reeling core/cores and after the cutting of the web/webs the reeling up is continued thereon. This change sequence also involves several mechanical functions and adjustment and control measures of the same, as is described for example in Papermaking Part 3, Finishing, pp. 162–163.

The above-described increase in the mechanical functions of the reel-up and the use of more complex adjustment and control methods also have effects that reduce the overall operating reliability of the reel-up. The simple reason for this is that as the functions of the apparatus and the system are increased, the number of potential points of failure in the system increases as well. This applies especially to measuring sensors and measuring methods necessary in the above-described more complex adjustment and control methods, which are required in larger numbers and for which higher and higher accuracy demands have to be placed at the same time.

The operating reliability of the reel-up can, of course be improved, if all components that are critical in view of the operation, or at least the components that are most liable to faults, such as for example said measuring sensors, are doubled. It is not, however, technically possible to secure all the components by doubling them, and the drawback of the doubled system is the further increasing complexity as well as significantly higher costs.

SUMMARY OF THE INVENTION

The purpose of the present invention is to present a method for improving the operating reliability of the reel-up of a paper web by using a model-based, learning fault diagnostics which is substantially separate from the actual control system of the reel-up.

The method according to the invention is characterized by the following features that improve the operating reliability and controllability of the reeling up process, which features can be attained without securing the components of the reel-up physically i.e. by doubling the components, and thus the increasing complexity of the system as well as the thereby increasing costs can be avoided.

The fault diagnostics according to the invention learns in a learning state in the normal operating modes of the reel-up, including the change sequences of the full roll/rolls and the empty reeling core/cores, the normal dependencies between the control, measuring and actuating variables of the reel-up by monitoring the same.

In a diagnostic state the fault diagnostics detects the malfunctions of the components which are critical in view of the function of the reel-up by monitoring aforementioned measuring, control and actuating variables and comparing them to the model formed in the learning state. The malfunctions are detected when they cause, or advantageously already before they cause a substantial weakening or interruption in the function of the reel-up. When the fault diagnostics detect a fault or changes preceding a likely fault, the fault diagnostics warns the user and/or gives an alarm and shifts to a fault tolerance state, if necessary.

In the fault tolerance state the fault diagnostics actively affects the measuring and/or control variables to maintain the function of the reel-up, compensating on the basis of the learned model the malfunction caused by the fault/faults in the actual control system as well as in the function of the reel-up.

The central advantage of the method according to the invention is that the information required by the fault diagnostics can be collected primarily by means of sensors and measurements of the reel-up itself, which are already in use because of the needs of the actual control system. Fault diagnostics, when implemented separately from the actual control system, can also be easily coupled to different types of control systems to be used in connection with the same.

The analysis of the collected information by means of developed, learning and self-controlled algorithms enables the detection of a likely fault already before it causes a substantial weakening or interruption in the function of the reel-up.

The measuring and control values calculated on the basis of the model formed on the process by the learning algorithm can be utilized to supplement and replace the function of said damaged components.

In addition to the learning and diagnostics during the normal reeling up sequence, information on the function of the components is also collected in connection with the change sequence of the full roll/rolls and/or the empty reeling core/cores, which takes place at fixed intervals. The masses of the full roll/rolls and/or the empty reeling core/cores as well as the masses of the members moved during the change sequence are substantially known, wherein the force and frictions required in the transfer of the same can be predicted when the components of the apparatus function normally, and thus, during the transfer movement this information can be used for controlling the condition of the components that conduct and/or control and/or monitor the transfer movement. By comparing the changes in the measuring, control and/or actuating variables during successive transfer movements within a longer period of time it is possible to obtain information on the changes occurring in the components participating in the transfer movement.

BRIEF DESCRIPTION OF THE DRAWINGS

In the following, the invention will be described in more detail by means of examples and with reference to the appended drawings.

DESCRIPTION OF THE PREFERRED EMBODIMENTS

Figure 1:
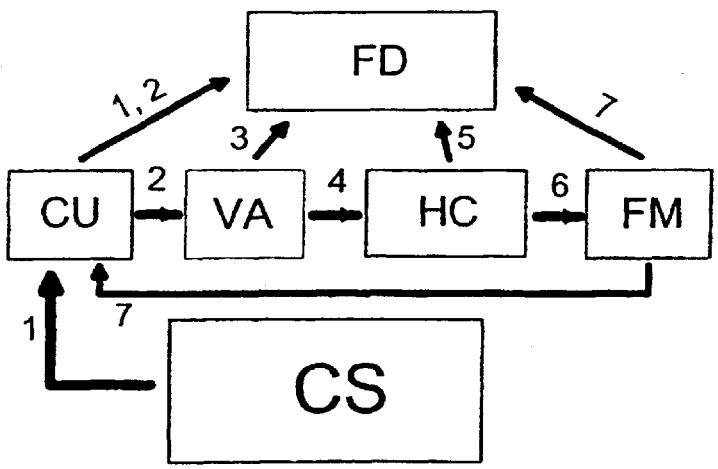
FIG. 1 shows the method according to the invention in a block chart when it functions in a learning state and is arranged in connection with a specific function of the reel-up which will be described in more detail in the text.

The function shown as an example in FIG. 1 consists of a control unit CU, which, after receiving from the actual control system CS a control value 1 indicating a desired force effect, transmits a control variable 2 to a hydraulic valve VA. In the hydraulic valve VA the opening of the valve stem which is indicated by a measured value 3 is adjusted in such a manner that the stem releases from a pressure accumulator, hydraulic pump or a corresponding known source that is coupled to the feed side of the hydraulic valve, a hydraulic oil flow 4 according to the control variable 2 to a hydraulic cylinder HC. The hydraulic cylinder HC generates a pressure as a result of the hydraulic oil flow 4 inside said cylinder, which pressure is indicated by a measured value 5, said pressure pushing the piston with a force 6. This force is measured by means of a force sensor FM. From the force sensor FM a measured value 7 of the force produced by the hydraulic cylinder HC is fed back to the control unit CU, and through this feedback the control unit aims at adjusting the hydraulic valve VA to attain a desired force 6 according to the control value 1.

In the situation according to FIG. 1, the fault diagnostics operates in a learning state, in which by monitoring the measuring, control and actuating variables (1, 2, 3, 5 and 7) of the system that operates without malfunctions or faults of the components, the fault diagnostics learns the dependencies between said variables.

The aforementioned learning can be model-based in such a manner that the fault diagnostics FD contains a model on the operation of the process to be monitored in the form of mathematical function/functions, and in the learning state the parameters contained in said function/functions are tuned. After the tuning, the function/functions can be utilized to calculate for example the value of the variable 7 by means of the values 1, 2, 3 and 5. If the process to be examined contains a large number of measuring, control and actuating variables to be monitored, and the mutual dependency of these cannot be expressed in the form of a conventional mathematical model, it is possible to attain the learning algorithm contained in the fault diagnostics also by using so-called neural network computation or so-called fuzzy logic/computation. Further, the model-based learning can also take place by means of a so-called expert system, wherein the dependencies between different measuring, control and actuating variables are represented by means of a set of rules contained in the expert system.

Figure 2:
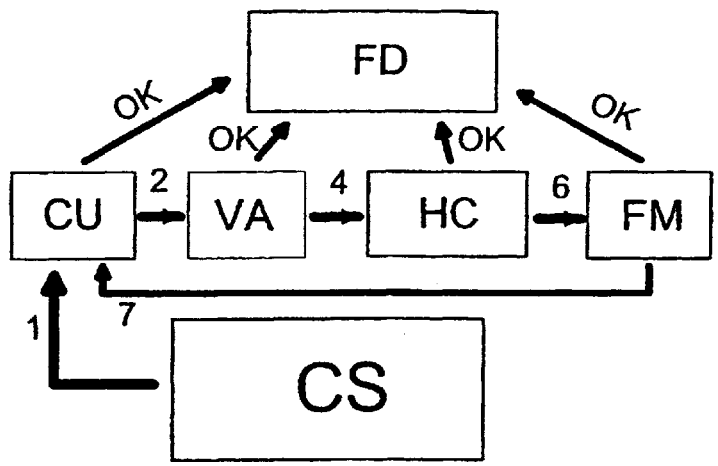
FIG. 2 shows a situation corresponding to FIG. 1 with a distinction that instead of the learning state the fault diagnostics functions in a diagnostic state.

FIG. 2 illustrates the function of the fault diagnostics in a diagnostic state. Thus, the fault diagnostics monitors the variables measured from the process, and compares the values of the same with the values given by the model formed in the learning state. When the fault diagnostics detects that a variable deviates from the values given by the model, the fault diagnostics determines the faulty component and warns the user and/or gives an alarm.

Figure 3:
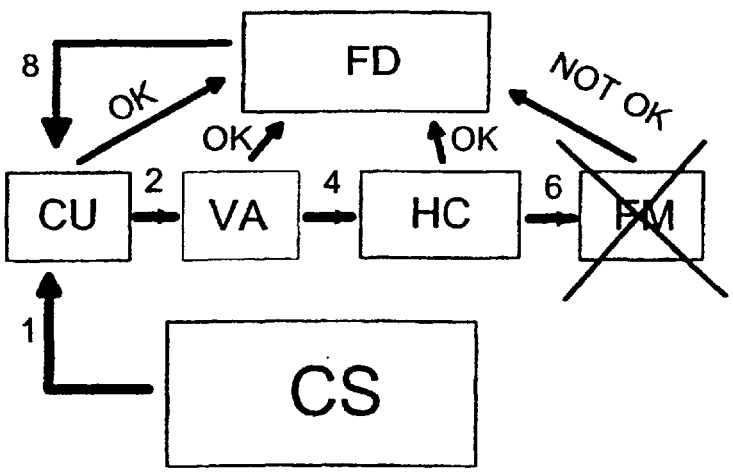
FIG. 3 shows a situation corresponding to FIGS. 1 and 2 in a block chart with a distinction that the fault diagnostics functions in a fault tolerance state.

FIG. 3 shows the function of the fault diagnostics in a fault tolerance state to which the fault diagnostics has shifted after it has detected a fault. In the fault tolerance state the fault diagnostics produces a simulated variable on the basis of the model it has learned and transmits it actively to a suitable point in the process to maintain the function of the process. In the case of FIG. 3, when a fault has occurred in the force sensor FM, the original measured value 7 is replaced with a simulated measured value 8, which is transmitted to the control unit CU. Thus, despite the fault of the force sensor FM, the function of the hydraulic cylinder HC under the control of the control system can be maintained correct in the accuracy with which the simulated signal 8 corresponds to the original signal 7 in said situation.

Figure 4:
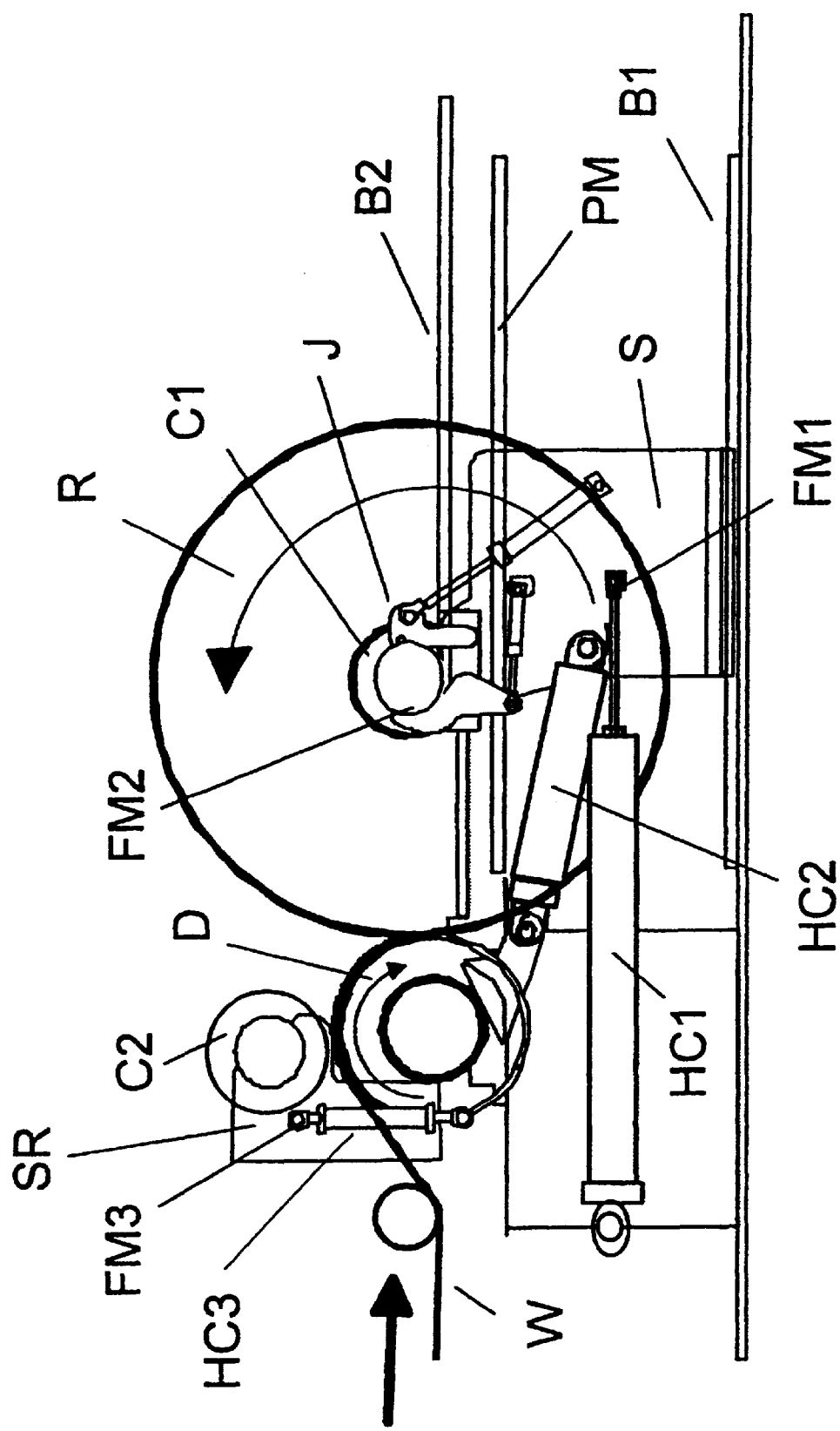
FIG. 4 illustrates in a side-view the act of applying the method according to the invention in different functions of the reel-up.

FIG. 4 illustrates the function of one reel-up type and the components of the same, in connection with which the fault diagnostics according to the invention can be applied.

In the reel-up according to FIG. 4, a paper web is brought to the actual reel spool C1 via a reeling cylinder D, i.e. a so-called nipping cylinder, the paper web being reeled on said reel spool forming a reel R thereon. The pressing force, i.e. so-called nip force between the nipping cylinder D and the reel R to be formed on the reel spool is one of the essential parameters to be adjusted in the reeling up process. During the reeling up process this nip force is adjusted by means of a reeling cylinder HC1 that moves a reeling carriage S. The reeling carriage S is connected to the ends of the shaft of the reel spool C1, more precisely to its bearing housings, in which the shaft of the reel spool C1 is arranged to rotate. The end of the hydraulic cylinder HC1 on the side of the reeling carriage S is equipped with a force sensor FM1, which measures the force produced by said hydraulic cylinder in the reeling carriage S, and thereby also the nip force between the reel R and the nipping cylinder D. The adjustment of the nip force produced by the hydraulic cylinder HC1 in a manner described above can be monitored by means of fault diagnostics according to FIGS. 1 to 3.

When the reel R shown in FIG. 4 reaches a desired diameter, i.e. the roll becomes full, the hydraulic cylinder HC1 starts to move the reeling carriage S to the right in the drawing, wherein the reel R moves off the nipping cylinder D and further away from the same. This makes it possible to turn the empty reeling core C2 standing ready in the primary reeling device SR by means of the hydraulic cylinder HC2 to the right around an axis of rotation parallel to the central shaft of the nipping cylinder D, in such a manner that the reeling core C2 finally ends up on the support of its shaft ends and bearing housings arranged in said shaft ends on guides B2. In an alternative solution of prior art the reeling core C2 is lowered on the support of rail carriages which are arranged movable on top of the guides B2. During the aforementioned turning, the empty reeling core C2 is accelerated to a web speed corresponding to the speed of the paper web, and the paper web is cut and a web change to the new reeling core C2 is conducted according to prior art.

In FIG. 4 the act of bringing the new reeling core C2 to the primary reeling device, the centre drives of said reeling core and the nipping cylinder D and the functions related to the cutting and threading of the paper web W are not described in more detail because they are not part of the invention. The aforementioned functions may be based on suitable solutions of prior art. Furthermore, FIG. 4 does not describe the centre-drive of the reel R, the act of slowing down the rotating speed of the finished roll or other corresponding functions required for transferring the reel R away from the guides B2 because they do not fall within the scope of the invention. The reeling core C1 and C2 may be arranged to rotate in bearing housings etc. by means of prior art solutions, and said bearing housings can move on the support of the guides B2, either directly on top of the guides or on the support of rail carriages arranged movable on said guides. Furthermore, the guides B2 may be arranged in such a manner that the reeling core/reel moves part of the way on the support of the rail carriage and/or reeling carriage, and part of the way on the support of the reeling carriage, or only on the support of the guides B2.

The use of fault diagnostics according to the invention is not, of course, restricted only to the monitoring of the adjustment of the nip force produced by the hydraulic cylinder HC1 shown in FIG. 4. When a full reel R is moved aside (in FIG. 4 to the right on guides B) in the above-described manner by means of the hydraulic cylinder HC1 to restart reeling on the new reeling core C2, it is possible to monitor the condition and perform the fault diagnostics of the components participating in the transfer movement in the ways described hereinbelow.

When the total mass of the full reel R is substantially known, the force required in the transfer of the reel R by means of the hydraulic cylinder HC1 can be predicted and/or measured in a situation where the apparatus functions normally and the frictions related to the movements are normal. When the aforementioned transfer movement is conducted, it is possible to monitor the reading of the force sensor FM1 (and the reading of a corresponding sensor on the other side of the apparatus, on the other end of the reel) during said transfer movement, and if it is observed that the reading deviates from the predicted one and/or from the value measured earlier, it is possible to conclude that a fault has occurred in the force sensor or a change has occurred in the forces required in producing the transfer movement. To locate the fault more accurately, it is possible to use hydraulic pressure (in FIGS. 1 to 3 the measured variable 5) measured from the hydraulic cylinder HC1. When the aforementioned hydraulic pressure is known, it is possible, when the hydraulic cylinder functions normally, to utilize the same to define the force produced by the hydraulic cylinder, which is compared with the reading given by the force sensor FM1.

When the force sensor operates properly, but force values which are higher than the normal force value are still detected during the transfer movement, the mechanical frictions have been increased either on the guide B1 (support of the reeling carriage S) or on the guide B2 (support of the end bearing housings of the reeling core either directly or via separate rail carriages). When a force sensor FM2 (FIG. 4) is added to measure the force transmitted via locking jaws J in the transfer of the reel R, it is, on the basis of the mutual behaviour of the force measurements, possible to determine whether the friction has increased in the guide B1 or B2. By monitoring the force FM1 required in the return movement of the empty carriage without the weight and friction effect of the full reel R and the reeling core C1, it is possible to obtain further information to find out which guide B1 or B2 caused the detected increase in the force in the transfer movement of the full reel.

The information given by a location sensor PM (FIG. 4) can be used during aforementioned transfer movements in the measurements of friction in such a manner that during the definition of the friction by means of the force measurement the transfer speed of said transfer movement is kept constant by means of the information given by the location sensor PM. Thus, the deviations detected by means of the force measurements FM1, FM2 result precisely from the changes in the frictions and not from the accelerating or decelerating movement.

The value given by the location sensor PM can, on the other hand, be compared to the opening in the valve stem of the hydraulic valve used in the control of the hydraulic cylinder (FIG. 1, measured value 3). Because a given opening of the valve stem produces a fixed volume flow of the hydraulic oil (FIG. 1, variable 4), said opening/volume flow should in a normal situation i.e. without increased frictions and/or leaks in the hydraulic system, correspond to the transfer speed measured from the reading given by the location sensor PM during the transfer movement.

In addition to the kinetic friction/frictions measured during the aforementioned transfer movements, fault diagnostics can also be performed by utilizing the transient behaviour of the force/forces required for overcoming the static frictions in the beginning of aforementioned transfer movements. These measurements can be conducted when the transfer of the full reel R is started and in a corresponding manner when the return movement of the reeling carriage S is started. In this situation it is possible to utilize the location sensor PM to determine the acceleration and speed of the movement, by means of which it is possible to define the forces required in this situation in theory, which forces can be further compared to the values given by the force measurement.

It is, of course, obvious that the use of the fault diagnostics according to the invention is not restricted solely to the monitoring of the above-described functions attained by means of the hydraulic cylinder HC1, but in a corresponding manner the fault diagnostics can be utilized in connection with the functions of the primary reeling device SR. In the primary reeling device SR the hydraulic cylinder HC3 adjusts the nip force between the reeling core/early reel C2 and the nipping cylinder D, which nip force is measured with a force sensor FM3. This adjustment of the nip force as well as the fault diagnostics of the same correspond to the situation shown in FIGS. 1 to 3. In the primary reeling device SR, the turning of the primary reeling device from the vertical position to the horizontal position by means of a hydraulic cylinder HC2 corresponds to the linear transfer movement of the reel R by means of the hydraulic cylinder HC1. During this movement sequence it is possible to conduct fault diagnostics based on static and kinetic frictions when the reeling core C2 is attached to the primary reeling device, or when the primary reeling device SR moves back into its initial position (vertical position) without the reeling core, preparing itself for receiving a new empty reeling core.

When the other ends of the hydraulic cylinders (e.g. HC1, HC3) are supplemented with force measurement as well, and the forces measured from both ends of the hydraulic cylinders correspond to each other (i.e. it can be assumed that said force sensors operate faultlessly), but the force value calculated from the inner hydraulic pressure of said cylinder deviates from the value of aforementioned force sensors, the reason for this is an increase in the inner frictions of the hydraulic cylinders, in other words changes in frictions caused by wearing of the sealing of the cylinder. The aforementioned cylinder friction can be detected by measuring the hydraulic pressure from both ends of the hydraulic piston inside the hydraulic cylinder (e.g. HC1) and comparing the force value calculated therefrom with the reading of the corresponding force sensor (e.g. FM1).

The fault diagnostics according to the invention, as far as conducted outside the actual reeling up sequence, in other words in connection with a change sequence of the full reel/reels and/or the empty reeling core/cores which is repeated at fixed intervals, can, in addition to the aforementioned normal change sequences, be conducted automatically, if necessary, always when the continuous function of the reel-up has been interrupted as a result of a fault, e.g. web break, that has occurred elsewhere in the production process. The user can also give a command for conducting said diagnostics sequence when the situation so requires/allows.

In addition to the dependencies between the above-described measuring, control and actuating variables the fault diagnostics can also monitor the time used for performing the aforementioned different sequences to detect and predict a fault situation, i.e. monitor the transfer time of said sequences. If the duration required by a particular sequence contains for example an increasing trend, an alarm is given after a predetermined alarm limit, and the system shifts to the fault tolerance state, if necessary.

Even though the above-described examples for the sake of clarity only refer to a reel-up of a particular type, equipped with functions of particular type, the use of the invention is not restricted solely to the reel-ups according to these examples. According to the inventive aspects described in the claims it is possible to apply the invention also in reel-ups of other types.

Furthermore, the use of the invention is not restricted solely to the fault diagnostics of hydraulically implemented functions of the reel-up, but it can be applied in other such functions of the reel-up for the implementation of which functional blocks according to FIGS. 1 to 3 are used. These can, for example, include systems related to the adjustment of torque or speed of rotating machines, in which a control unit on the basis of the control value of the adjustment system controls the function of the electric motor by means of an electric adjuster, in which function the torque or the rotating speed are measured by means of a suitable measuring sensor, which gives a signal that is fed back to the control unit. The fault diagnostics according to the invention can be applied according to the same principles for rotating or linear movements controlled by the control system, which movements are implemented hydraulically, electrically or pneumatically.

According to the details presented above, the use of the invention is not restricted solely to the control of such components which are the same as the components used during the actual reeling up sequence or primary reeling sequence to produce and adjust nip force, or the components participating in the transfer movement during the change sequence. According to the inventive aspects presented in the claims, the method can also be applied in the fault diagnostics of other components/functions, for example in the monitoring of functions used in centre-drives used in the reel-ups as well as for example in the adjustment of web tension.

What is claimed is:

1. A method for improving the operating reliability of a reel-up in which a continuous paper web is reeled around a reeling core to form a full reel, the reel-up having a control system that controls the reeling up, and a substantially separate model-based, learning fault diagnostics, the learning fault diagnostics operating in a learning state to learn normal operating modes of the reel-up, including a change sequence of the full reel and an empty reeling core, and to learn dependencies between measuring, control, and actuating variables of the reel-up by monitoring the measuring, the control, and the actuating variables for a first period of time, so forming a model of the operation of the reel-up;

the learning fault diagnostics operating in a diagnostic state to detect a malfunction of a component which is critical to operation of the reel-up by monitoring the measuring, the control and the actuating variables and comparing them with the model formed in the learning state, and after the learning fault diagnostics detects a fault in at least one of the control system and the reel-up, shifting the reel-up into a fault tolerance state, the learning fault diagnostics actively affecting the measuring, control and actuating variables to maintain the function of the reel-up, compensating on the basis of the model it has formed.

2. The method of claim 1, further comprising monitoring the measuring, the control and the actuating variables during a second period of time which is longer than the first period of time and comparing the measuring, the control and the actuating variables behavior during the second period of time, with the model formed in the learning state, the learning fault diagnostics predicting a malfunction in at least one of the control system and the reel-up which is critical to the operation of the reel-up.

3. The method of claim 1, wherein after the learning fault diagnostics has detected a fault, said fault diagnostics warns the user.

4. The method of claim 1, wherein the learning capability of the learning fault diagnostics is based on the use of a neural network.

5. The method of claim 1, wherein that the learning capability of the learning fault diagnostics is based on the use of fuzzy logic.

6. The method of claim 1, wherein the learning capability of the learning fault diagnostics is based on tuning parameters of at least one function contained in a mathematical model of the operating modes of the reel-up.

7. The method of claim 1, wherein the fault diagnostics is conducted for components related to production, adjustment and measurement of the nip force between the reel formed on the reel core and a nipping cylinder during an actual reeling up sequence.

8. The method of claim 1, wherein the fault diagnostics is conducted for the components related to production, adjustment and measurement of the nip force between the reel formed on the reel core and a nipping cylinder during a primary reeling sequence.

9. The method of claim 1, wherein in connection with a change sequence of the full reel and reeling core at fixed intervals, during a transfer movement of the reel and reeling core, measurements are conducted to define the condition of components conducting the transfer movement.

10. The method of claim 9, wherein to conduct the transfer movement belonging to the change sequence, the forces necessary for the transfer movement are measured by means of a force sensor to check the function of said force sensor.

11. The method of claim 9, wherein to conduct the transfer movement belonging to the change sequence, the necessary forces are measured by means of the force sensors to define kinetic and static frictions as well as the condition of the components affecting said frictions.

12. The method of claim 9, wherein in addition to the force sensors, the force required for conducting the transfer movement belonging to the change sequence is defined by a measurement of hydraulic pressure of a hydraulic cylinder used for producing said force.

13. The method of claim 9, wherein the fault diagnostics of the transfer movement and the components related thereto is conducted when the full reel is transferred away from the area of influence of the nipping cylinder by means of a reeling carriage along guides during the return movement.

14. The method of claim 9, wherein fault diagnostics of the transfer movement and the components related thereto is conducted when a primary reeling device and an empty reeling core attached thereto are turned from a starting position to an actual reeling position of the primary reeling device without the reeling core.

15. The method of claim 9, wherein force members used for conducting the transfer movement belonging to the change sequence are the same as the force members used during the actual reeling up sequence for producing nip force, and further, said force sensors are the same as the sensors used during the reeling up in the measurement of nip force.

16. The method of claim 1, wherein in connection with a change sequence of the full reel and reeling core at fixed intervals, during a transfer movement of the reel and reeling core, measurements are conducted to define the condition of components controlling the transfer movement.

17. The method of claim 1, wherein in connection with a change sequence of the full reel and reeling core at fixed intervals, during a transfer movement of the reel and reeling core, measurements are conducted to define the condition of components monitoring the transfer movement.

18. The method of claim 1, wherein after the learning fault diagnostics has predicted a fault, said fault diagnostics warns the user.

* * * * *

UNITED STATES PATENT AND TRADEMARK OFFICE
CERTIFICATE OF CORRECTION

PATENT NO.   : 6,752,347 B2
DATED        : June 22, 2004
INVENTOR(S)  : Petteri Lannes et al.

It is certified that error appears in the above-identified patent and that said Letters Patent is hereby corrected as shown below:

Title page,
Insert Item:
-- [30]         Foreign Application Priority Data
        Apr. 12, 2000   (FI).................................20000869 --

Signed and Sealed this

Eighth Day of February, 2005

JON W. DUDAS
*Director of the United States Patent and Trademark Office*